(12) United States Patent
No et al.

(10) Patent No.: US 10,923,914 B2
(45) Date of Patent: Feb. 16, 2021

(54) APPARATUS AND METHOD FOR CONTROLLING CIRCUIT BREAKER FOR STATIC SYNCHRONOUS COMPENSATOR

(71) Applicant: HYOSUNG HEAVY INDUSTRIES CORPORATION, Seoul (KR)

(72) Inventors: Jae Keun No, Seoul (KR); Chol Jin Ko, Namyangju-si (KR)

(73) Assignee: HYOSUNG HEAVY INDUSTRIES CORPORATION, Seoul (KR)

(*) Notice: Subject to any disclaimer, the term of this patent is extended or adjusted under 35 U.S.C. 154(b) by 365 days.

(21) Appl. No.: 16/067,482

(22) PCT Filed: Jun. 22, 2016

(86) PCT No.: PCT/KR2016/006636
§ 371 (c)(1),
(2) Date: Jun. 29, 2018

(87) PCT Pub. No.: WO2017/115951
PCT Pub. Date: Jul. 6, 2017

(65) Prior Publication Data
US 2019/0027934 A1 Jan. 24, 2019

(30) Foreign Application Priority Data
Dec. 30, 2015 (KR) .................. 10-2015-0190337

(51) Int. Cl.
*H02J 3/18* (2006.01)
*H02J 7/04* (2006.01)
(Continued)

(52) U.S. Cl.
CPC .............. *H02J 3/18* (2013.01); *G05F 1/70* (2013.01); *H02H 7/04* (2013.01); *H02H 7/042* (2013.01);
(Continued)

(58) Field of Classification Search
CPC .. H02J 3/18; H02H 7/04; H02H 7/042; H02H 7/0455; H02H 1/043
See application file for complete search history.

(56) References Cited

U.S. PATENT DOCUMENTS 4,636,708 A * 1/1987 Whyte .................. H02J 3/1864
323/210
5,995,394 A * 11/1999 Svensson .............. H02J 3/1842
363/51

(Continued)

FOREIGN PATENT DOCUMENTS

JP  58-155430 A   9/1983
JP  2002-281670 A 9/2002
(Continued)

OTHER PUBLICATIONS

Machine Translation of Ha et al., Apr. 8, 2013, Korean Patent Document, KR 2013034769 A, pp. 1-10. (Year: 2013).*

*Primary Examiner* — Thienvu V Tran
*Assistant Examiner* — Bart Iliya
(74) *Attorney, Agent, or Firm* — Novick, Kim & Lee, PLLC; Jae Yoon Kim

(57) ABSTRACT

Provided is an apparatus and method for controlling a circuit breaker for a static synchronous compensator (STATCOM) such that the circuit breaker installed in a branch line for the STATCOM is operated according to the current control characteristics of the STATCOM, the apparatus including: a transformer protector for detecting the differential current between primary current and secondary current of a transformer connected in series to the circuit breaker in the branch line, and controlling the opening/closing of the circuit breaker; and a STATCOM controller for controlling an operation of the STATCOM, wherein the STATCOM controller outputs, to the transformer protector, an opening suspension signal for suspending the opening of the circuit (Continued)

breaker when overvoltage occurring in the STATCOM is detected, and the transformer protector suspends output of a circuit breaker opening signal to the circuit breaker according to the received opening suspension signal.

4 Claims, 4 Drawing Sheets

(51) Int. Cl.
    *H02H 7/045*     (2006.01)
    *G05F 1/70*     (2006.01)
    *H02H 1/04*     (2006.01)
    *H02H 7/04*     (2006.01)

(52) U.S. Cl.
    CPC ........... *H02H 7/0455* (2013.01); *H02H 1/043* (2013.01); *Y02E 40/10* (2013.01); *Y02E 40/30* (2013.01)

(56) References Cited

U.S. PATENT DOCUMENTS

| | | |
|---|---|---|
| 2009/0212643 A1 | 8/2009 | Skliutas et al. |
| 2010/0053830 A1* | 3/2010 | Andersson ................ G05F 1/00 361/91.1 |
| 2010/0207463 A1 | 8/2010 | Fortmann et al. |
| 2013/0128393 A1 | 5/2013 | Gajic |
| 2017/0115335 A1* | 4/2017 | Pamulaparthy ........ G01R 31/50 |

FOREIGN PATENT DOCUMENTS

| | | |
|---|---|---|
| JP | 2007-006663 A | 1/2007 |
| KR | 10-2013-0034769 A | 4/2013 |
| KR | 10-1401038 B1 | 5/2014 |
| WO | 2015085407 A1 | 6/2015 |

* cited by examiner

APPARATUS AND METHOD FOR CONTROLLING CIRCUIT BREAKER FOR STATIC SYNCHRONOUS COMPENSATOR

TECHNICAL FIELD

The present invention relates to an apparatus and a method for controlling a circuit breaker for a static synchronous compensator (STATCOM) and, more particularly, to an apparatus and a method for controlling a circuit breaker for a STATCOM such that the circuit breaker installed in a STATCOM-dedicated branch line is operated according to current control characteristics of the STATCOM.

BACKGROUND ART

Reactive power compensation is essential for stable operation of an AC power system. Therefore, a Static Var Compensation (SVC), a STATCOM, and the like using fast reactivity of powered electronic devices are being used as a dynamic reserve reactive power source of the power system.

Generally, the STATCOM is connected to a main bus of the power system, and plays a role of supplying reactive power to the entire power system, and thus enhancing transmission efficiency of active power.

FIG. 1 is a configuration diagram showing a protection system for a general STATCOM-dedicated branch line.

Referring to FIG. 1, a STATCOM 40 is connected to a STATCOM-dedicated branch line branched from a main bus 10 of the power system, through a circuit breaker 20 and a transformer 30. The STATCOM 40 is controlled by a STATCOM controller 50 and the transformer 30 is protected by a transformer protector 60. As described above, such various devices are implemented in the STATCOM-dedicated branch line to control and protect the STATCOM 40.

In this system, the transformer protector 60 is configured to operate only on a fault of the transformer 30 and not on other faults, so that an opening signal is transferred to the circuit breaker 20 to allow the circuit breaker to be opened as soon as the fault is detected in the power system, thereby protecting the transformer 30 and the STATCOM 40 from fault current.

The transformer protector 60 determines the fault by using a differential current between primary current and secondary current passing through the transformer 30 rather than a magnitude of the fault current. However, considering an operating characteristic curve of the transformer protector 60 according to the prior art, there occurred a situation in which the transformer protector 60 operates even when a fault does not occur in the power system.

FIG. 2 is an operating characteristic curve of a general transformer protector.

As shown in FIG. 2, the STATCOM 40 has a function of shutting down an internal converter at the time of overvoltage of 1.5 PU or more. This is to limit the current to 1.0 PU after a certain time in an overload mode when the system voltage approaches 1.5 PU. In the case that the overvoltage is about 1.49 PU, when the overvoltage of 1.49 PU flows for a certain time and then the overvoltage exceeds 1.5 PU, the current is rapidly limited to zero. In this case, the current decreases in a substantially linear form as shown by a reference character "A" in FIG. 2.

Due to such high-speed current characteristics of the STATCOM, the transformer protector 60 experiences through an operating region when switching from maximum current control to zero current control and thus operates in the operating region to transmit an opening signal to the circuit breaker 20. Such a change in operating characteristics is a very dangerous differential current change with respect to the transformer protector 60 which must operate at a high speed and causes a malfunction that drives the circuit breaker 20 even though there is no a fault in the power system. Particularly, such an operation is performed within a half period, so that there is a problem that a possibility of malfunction is increased in the transformer protector 60 that must perform data-based determination within a half period to one period in order to operate the circuit breaker in a high speed.

Generally, the circuit breaker 20 for the STATCOM has a very high frequency in opening/closing due to its characteristics. This becomes a factor that shortens the life span, which results in costly maintenance. Therefore, there is a need for a technique that reduces the number of times of opening and closing the circuit breaker 20 due to a malfunction and operates only when the power system fails in accordance with the original purpose of the circuit breaker 20.

DISCLOSURE

Technical Problem

Accordingly, the present invention has been made keeping in mind the above problems occurring in the prior art, and an object of the present invention is to provide a apparatus and a method for controlling a circuit breaker for a STATCOM such that the circuit breaker installed in a STATCOM-dedicated branch line branched from a power system operates according to the current control characteristics of the STATCOM.

It is another object of the present invention to provide an apparatus and method for controlling a circuit breaker for a STATCOM in which a transformer protector installed in a STATCOM branch line is caused to operate only when a fault occurs in a power system, thereby reducing a malfunction of the circuit breaker.

Technical Solution

In order to accomplish the above object, according to an embodiment, the present invention provides an apparatus for controlling a circuit breaker for a static synchronous compensator (STATCOM) installed in a STATCOM-dedicated branch line branched from a main bus of a power system, the apparatus including: a transformer protector for detecting a differential current between primary current and secondary current of a transformer connected in series to the circuit breaker in the branch line, and controlling opening/closing of the circuit breaker; and a STATCOM controller for controlling an operation of the STATCOM, wherein the STATCOM controller outputs, to the transformer protector, an opening suspension signal for suspending the opening of the circuit breaker when overvoltage occurring in the STATCOM is detected, and the transformer protector suspends output of a circuit breaker opening signal to the circuit breaker according to the received opening suspension signal.

In the present invention, the transformer protector may determine whether or not a fault occurs in the power system from the detected differential current and output the opening signal to the circuit breaker when the fault occurs in the power system.

In the present invention, the transformer protector may output the opening signal to the circuit breaker regardless of whether or not the opening suspension signal is received from the STATCOM controller when the fault occurs in the power system.

In the present invention, the transformer protector may suspend the output of the opening signal to the circuit breaker even in an operation interval of a predefined operating characteristic curve when the opening suspension signal is received from the STATCOM controller.

In addition, according to an embodiment, the present invention provides a method of controlling a circuit breaker for a STATCOM installed in a STATCOM-dedicated branch line branched from a main bus of a power system, the method including: detecting overvoltage occurring in the STATCOM by a STATCOM controller; outputting an opening suspension signal for suspending opening of the circuit breaker to a transformer protector when the occurrence of the overvoltage is detected; and suspending output of a circuit breaker opening signal to the circuit breaker according to the received opening suspension signal by the transformer protector.

The method according to the present invention, after the suspending of the transmission of the circuit breaker opening signal, may further include: detecting a differential current between primary current and secondary current of a transformer connected in series to the circuit breaker in the branch line, by the transformer protector; and determining whether or not a fault occurs in the power system from the detected differential current; and outputting the opening signal to the circuit breaker when the fault occurs in the power system, by the transformer protector; and opening the branch line according to the received opening signal, by the circuit breaker.

In the present invention, the transformer protector may suspend the output of the circuit breaker opening signal to the circuit breaker even in an operation interval of a predefined operating characteristic curve when the opening suspension signal is received from the STATCOM controller.

Advantageous Effects

According to the present invention, since the circuit breaker installed in the STATCOM-dedicated branch line branched from the power system operates according to the current control characteristic of the STATCOM, the circuit breaker is opened only when the fault occurs in the power system, thereby preventing malfunction of the circuit breaker.

In addition, according to the present invention, maintenance costs can be reduced by reducing the number of times of opening and closing the circuit breaker for STATCOM.

MODE FOR INVENTION

Figure 1:
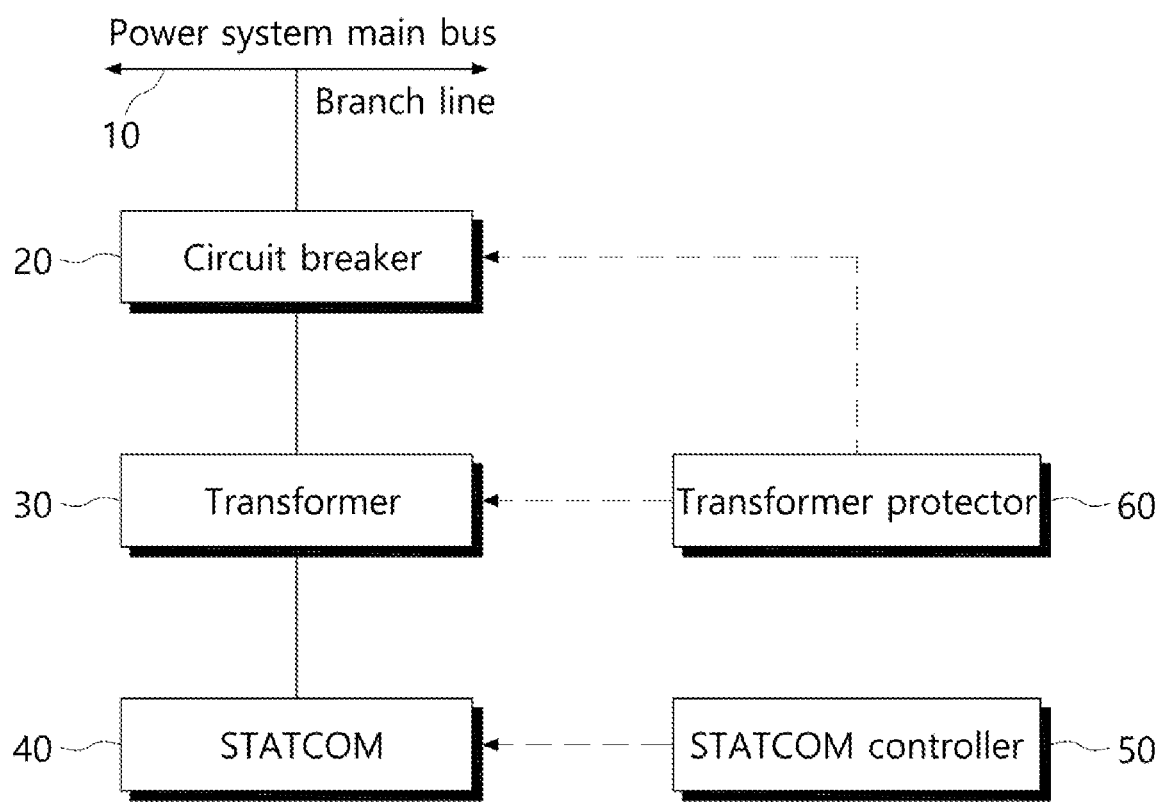
FIG. 1 is a configuration diagram showing a protection system in a general STATCOM dedicated branch line.
Figure 2:
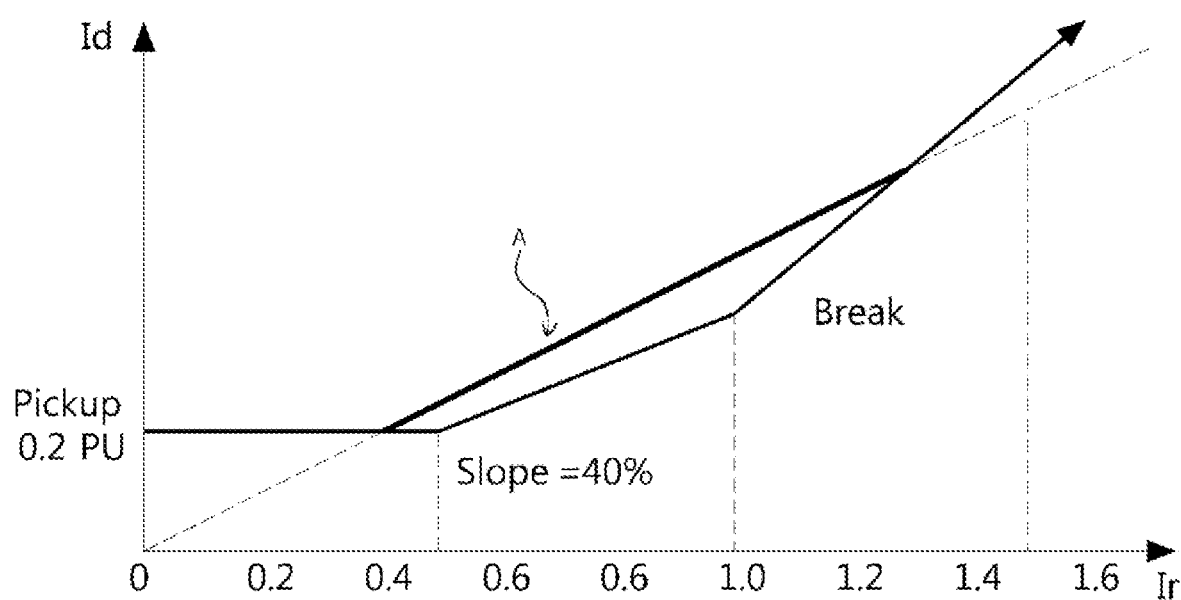
FIG. 2 shows an operating characteristic curve of a transformer protector for a general STATCOM.

Hereinafter, some embodiments of the present invention will be described in detail with reference to exemplary drawings. It is to be noted that, in adding reference numerals to the constituent elements of the drawings, the same constituent elements are denoted by the same reference numerals whenever possible, even if they are shown in different drawings. In the following description of the embodiments of the present invention, when it is determined that a detailed description of known functions and configurations incorporated herein hinders understanding for the embodiments of the present invention, the detailed description will be omitted.

In describing the components of the embodiment of the present invention, terms such as first, second, A, B, (a), and (b) can be used. These terms are intended to distinguish the constituent elements from other constituent elements, and the terms do not limit the nature, order or order of the constituent elements. When a constituent element is described as being "linked", "coupled", or "connected" to another constituent element, it will be appreciated that they can be directly coupled or connected, and also they can be "linked", "coupled", or "connected" with still another constituent element in between.

Figure 3:
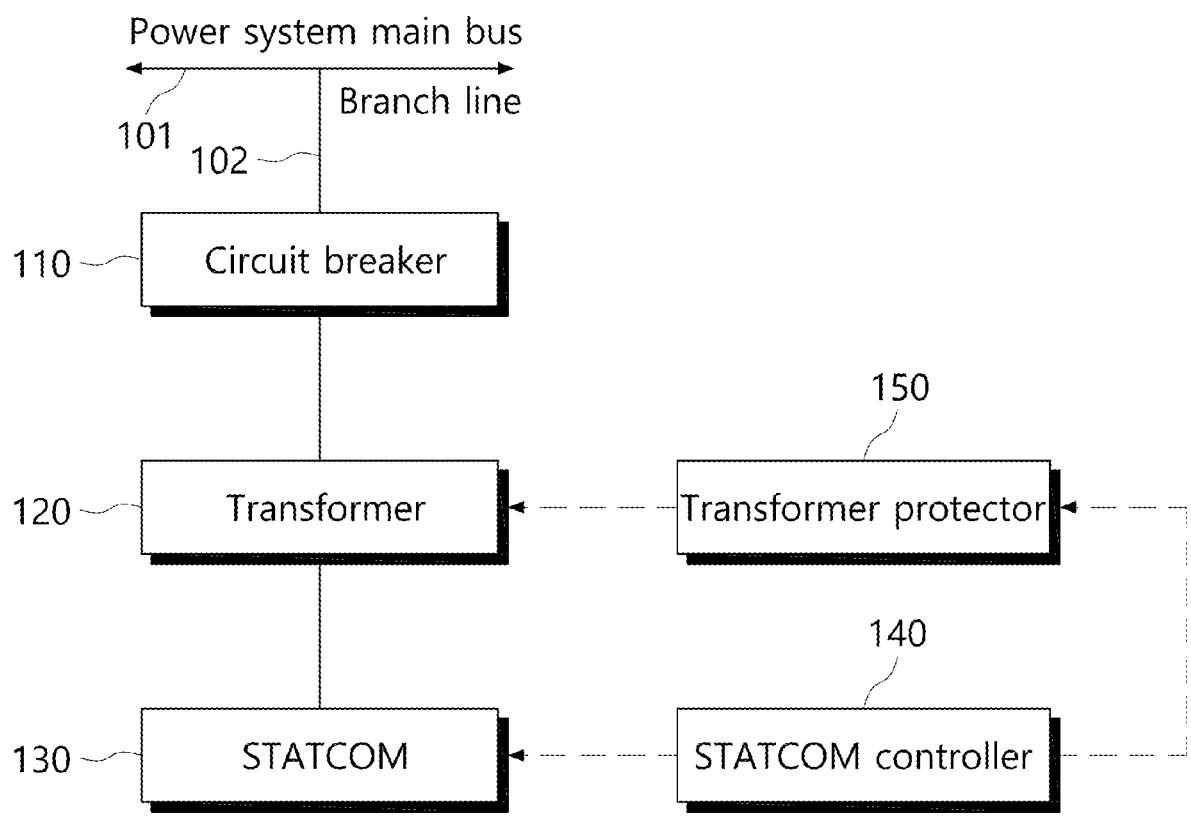
FIG. 3 is a configuration diagram showing a protection system in a STATCOM-dedicated branch line according to the present invention.

FIG. 3 is a configuration diagram showing a protection system in a STATCOM-dedicated branch line according to the present invention.

Referring to FIG. 3, a circuit breaker 110, a transformer 120, a STATCOM 130, a STATCOM controller 140, and a transformer protector 150 are installed in a STATCOM-dedicated branch line 102 according to the present invention. The branch line 102 branches from a power system main bus 101 and the STATCOM 130 is caused to supply reactive power to the power system via the power system main bus 101 and the branch line 102.

The circuit breaker 110 opens a circuit under the control of the transformer protector 150 to cut off the fault current when a fault occurs in the power system. Accordingly, the transformer 120 and the STATCOM 130 may be protected from the fault current.

The STATCOM 130 transmits the reactive power to the power system as described above. The STATCOM 130 may supply the reactive power to the power system by a maximum Q, which instantaneously increases system efficiency. However, when a problem such as an overvoltage occurs in the STATCOM 130, the reactive power must be instantaneously reduced from maximum Q to zero. It is preferable that this is suppressed to 0V within half a period. In this case, the maximum current (reactive current) is transmitted to the branch line 102 and the power system main bus 101 through the transformer 120 and the circuit breaker 110, and is supplied to the power system. This current will drop to zero within the half a period due to activation of a OV factor.

In this case, the transformer protector 150 operates because the transformer protector 150 experiences through an operating region thereof as described in the background art, in which the STATCOM controller 140 according to the present invention transmits a so-called opening suspension signal to the transformer protector 150 so that the transformer protector 150 does not transmit an opening signal to the circuit breaker 110.

When an overvoltage occurs in the STATCOM 130, the STATCOM controller 140 detects the overvoltage and then transmits the opening suspension signal for the circuit breaker 110 to the transformer protector 150, thereby preventing the circuit breaker 110 from being opened. That is, the transformer protector 150 does not output the opening signal to the circuit breaker 110 when the opening suspension signal is received from the STATCOM controller 140, so that no operation is performed on the circuit breaker 110.

This is because the circuit breaker 110 operates only when a fault occurs in the power system, which is the original function, and does not operate when the overvoltage occurs in the STATCOM 130. In particular, the transformer protector 150 does not output the opening signal to the circuit breaker 110 even in an operating interval in the predefined operating characteristic curve described above, when the opening suspension signal is received from the STATCOM controller 140.

Thus, the STATCOM controller 140 quickly detects an overvoltage occurrence and quickly transmits the opening suspension signal to the transformer protector 150, whereby the opening suspension of the circuit breaker 110 is performed at a very high speed. This is a special unique feature added to the STATCOM controller 140 according to the present invention, which is distinct from the background art.

Meanwhile, when a fault occurs in the power system regardless of whether or not the opening suspension signal is received from the STATCOM controller 140, the transformer protector 110 detects a differential current in the transformer 120 due to the fault current and then transmits the opening signal to allow the circuit breaker 110 to be opened. As a result, the circuit breaker 110 is opened. As described above, when a fault occurs in the power system, the circuit breaker 110 is cut off according to an original purpose.

Figure 4:
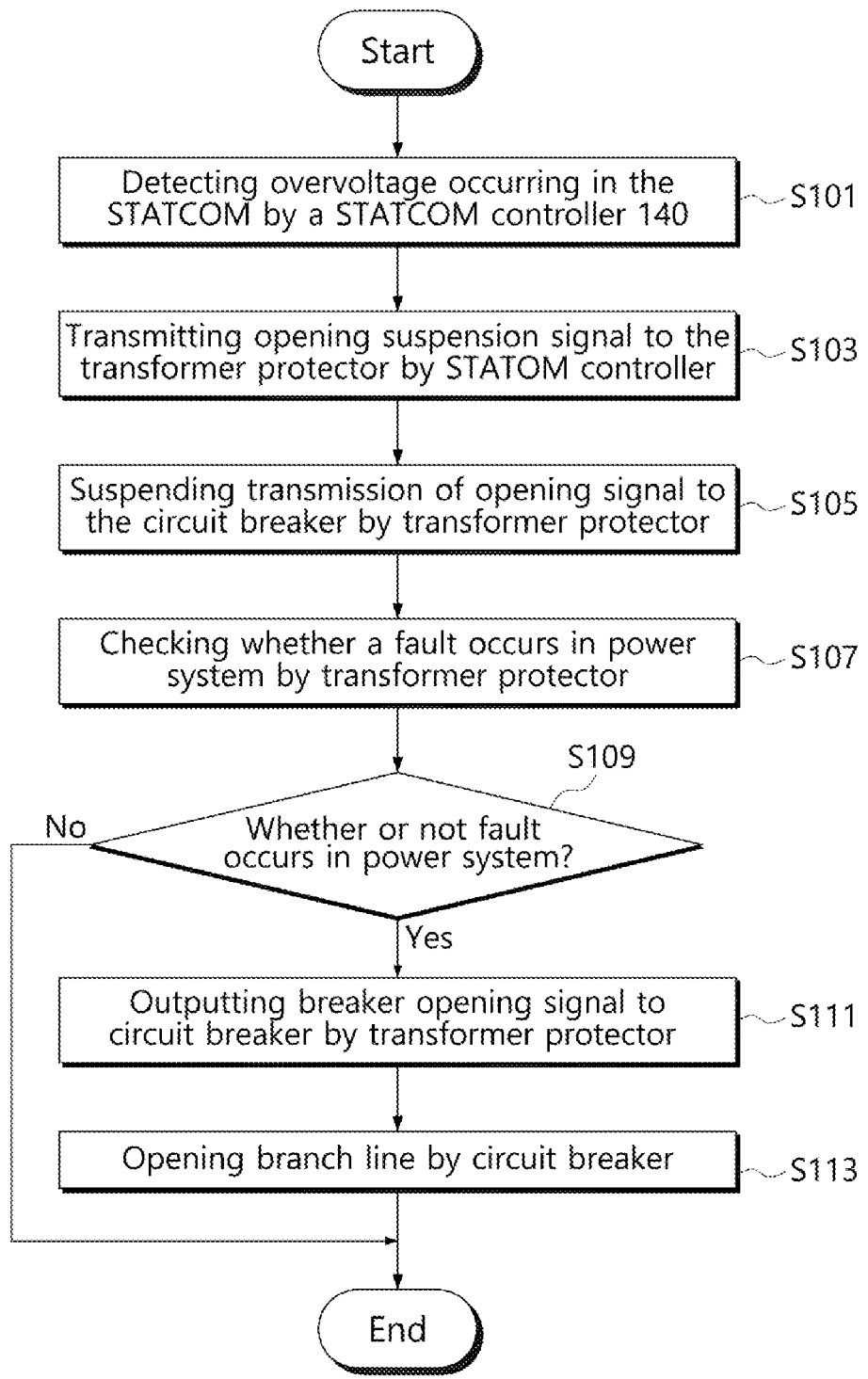
FIG. 4 is a flowchart illustrating a method of controlling a circuit breaker for a STATCOM according to the present invention.

FIG. 4 is a flowchart illustrating a method of controlling a circuit breaker for a STATCOM according to the present invention.

Referring to FIG. 4, according to a method of controlling a circuit breaker for a STATCOM of the present invention, overvoltage occurring in the STATCOM 130 is detected by a STATCOM controller 140 (S101). When the overvoltage is detected, an opening suspension signal is transmitted to the transformer protector 150 (S103). Upon receiving the opening suspension signal, the transformer protector 150 suspends transmission of the opening signal to the circuit breaker 110 (S105).

Thereafter, the transformer protector 150 checks whether a fault occurs in the power system through detection of a differential current in the transformer 120 (S107). When it is determined that the fault has occurred in the power system (S109), the transformer protector 150 transmits a breaker opening signal to the circuit breaker 110 regardless of whether the opening suspension signal is received from the STATCOM controller 140 (S111). The circuit breaker 110 opens the branch line 102 by the received opening signal (S113).

While the present invention has been described in connection with what is presently considered to be the most practical and preferred embodiment, it is to be understood that the invention is not limited to the disclosed embodiments. That is, within the scope of the present invention, one or more of all of the elements may be selectively coupled to each other. It is to be understood that the terms "includes", "comprises", or "having", as used herein, mean that a component can be implied unless specifically stated to the contrary, but should be construed as including other elements. All terms including technical or scientific terms have the same meaning as commonly understood by one of ordinary skill in the art to which this invention belongs, unless otherwise defined. Terms commonly used, such as predefined terms, should be interpreted to be consistent with the contextual meanings of the related art, and are not to be construed as ideal or overly formal, unless expressly defined to the contrary.

While the present invention has been described in connection with what is presently considered to be practical exemplary embodiments, it is to be understood that the invention is not limited to the disclosed embodiments. On the contrary, is intended to cover various modifications and equivalent arrangements included within the spirit and scope of the appended claims. Therefore, the embodiments disclosed in the present invention are not intended to limit the scope of the present invention but to limit the scope of the technical idea of the present invention. The scope of protection of the present invention should be construed according to the following claims, and all technical ideas within the scope of equivalents thereof should be construed as being included in the scope of the present invention.

The invention claimed is:

1. An apparatus for controlling a circuit breaker for a static synchronous compensator (STATCOM) installed in a STATCOM-dedicated branch line branched from a main bus of a power system, the apparatus comprising:
   a transformer protector for detecting a differential current between primary current and secondary current of a transformer connected in series to the circuit breaker in the branch line, and controlling opening/closing of the circuit breaker; and
   a STATCOM controller for controlling an operation of the STATCOM, wherein the STATCOM controller is configured to output, to the transformer protector, an opening suspension signal for suspending the opening of the circuit breaker when overvoltage occurring in the STATCOM is detected, and the transformer protector is configured to suspend output of a circuit breaker opening signal to the circuit breaker according to the received opening suspension signal,
   wherein the transformer protector is configured to determine whether or not a fault occurs in the power system from the detected differential current and output the circuit breaker opening signal to the circuit breaker when the fault occurs in the power system, and
   wherein the transformer protector is configured to output the circuit breaker opening signal to the circuit breaker regardless of whether or not the opening suspension signal is received from the STATCOM controller when the fault occurs in the power system.

2. The apparatus according to claim 1, wherein the transformer protector is configured to suspend the output of the circuit breaker opening signal to the circuit breaker even in an operation interval of a predefined curve for operating characteristic when the opening suspension signal is received from the STATCOM controller.

3. A method of controlling a circuit breaker for a STATCOM installed in a STATCOM-dedicated branch line branched from a main bus of a power system, the method comprising:
   detecting, by a STATCOM controller, overvoltage occurring in the STATCOM;
   outputting, by the STATCOM controller, an opening suspension signal for suspending opening of the circuit breaker to a transformer protector when the overvoltage is detected; and
   suspending, by the transformer protector, output of a circuit breaker opening signal to the circuit breaker according to the received opening suspension signal;
   detecting, by the transformer protector, a differential current between primary current and secondary current of a transformer connected in series to the circuit breaker in the branch line;

determining, by the transformer protector, whether or not a fault occurs in the power system from the detected differential current;

outputting, by the transformer protector, the circuit breaker opening signal to the circuit breaker when the fault occurs in the power system regardless of whether or not the opening suspension signal is received from the STATCOM controller; and opening, by the circuit breaker, the branch line according to the received opening signal.

4. The method according to claim 3, wherein the suspending of the output of the circuit breaker opening signal to the circuit breaker is performed even in an operation interval of a predefined curve for operating characteristic when the opening suspension signal is received from the STATCOM controller.

\* \* \* \* \*